United States Patent
Hunt et al.

(10) Patent No.: US 7,304,252 B1
(45) Date of Patent: Dec. 4, 2007

(54) METHOD AND SYSTEM FOR A TALKING WEIGHT LOSS SCALE

(75) Inventors: Ronald Eugene Hunt, Georgetown, TX (US); Verlon Eugene Whitehead, Austin, TX (US); Tod Alan Barrett, Austin, TX (US)

(73) Assignee: CD3, Inc., Austin, TX (US)

( * ) Notice: Subject to any disclaimer, the term of this patent is extended or adjusted under 35 U.S.C. 154(b) by 0 days.

(21) Appl. No.: 11/671,771

(22) Filed: Feb. 6, 2007

(51) Int. Cl.
*G01G 19/44* (2006.01)

(52) U.S. Cl. ............................. 177/25.13; 177/25.16; 177/25.19; 128/921

(58) Field of Classification Search .. 177/25.11–25.17, 177/25.19; 128/921
See application file for complete search history.

(56) References Cited

U.S. PATENT DOCUMENTS

| | | | | |
|---|---|---|---|---|
| 3,967,690 A | * | 7/1976 | Northcutt | 177/25.19 |
| 4,301,879 A | | 11/1981 | Dubow | |
| 4,366,873 A | * | 1/1983 | Levy et al. | 177/25.19 |
| 4,576,244 A | | 3/1986 | Zeigner et al. | |
| 4,844,187 A | * | 7/1989 | Jabero | 177/5 |
| 6,354,996 B1 | | 3/2002 | Drinan et al. | |
| 6,538,215 B2 | * | 3/2003 | Montagnino et al. | 177/25.16 |
| 6,617,530 B1 | * | 9/2003 | Lin | 177/25.16 |
| 6,649,848 B2 | * | 11/2003 | Kriger | 177/25.13 |
| 6,719,667 B2 | | 4/2004 | Wong et al. | |
| 2002/0134589 A1 | * | 9/2002 | Montagnino et al. | |

* cited by examiner

*Primary Examiner*—Randy W Gibson
(74) *Attorney, Agent, or Firm*—Dillon & Yudell LLP; Andrew J. Dillon

(57) ABSTRACT

A method of encouraging weight loss via a talking electronic scale. The talking electronic scale determines the weight of a particular person in response to a specific user input. The talking electronic scale utilizes a data storage unit to store and conceal an initial weight for the particular person. The talking electronic scale compares a subsequent weight of the particular person to the concealed initial weight in response to a specific user input and utilizes a speech synthesis unit to announce a difference between the concealed initial weight and the subsequent weight for the particular person without ever displaying or announcing the numerical value of the initial weight.

6 Claims, 3 Drawing Sheets

METHOD AND SYSTEM FOR A TALKING WEIGHT LOSS SCALE

BACKGROUND OF THE INVENTION

1. Technical Field

The present invention relates in general to the field of electronic scales and in particular to talking electronic scales. Still more particularly, the present invention relates to an improved method and system for encouraging weight loss via a talking electronic scale.

2. Description of the Related Art

Conventional electronic scales utilize graphical display screens to output the current weight of a user. In order to provide additional motivation to a user who is attempting to lose weight, it has been found that voice comments in response to the progress (or lack thereof) of a particular user can be extremely beneficial. Talking electronic scales utilize speech synthesis devices to emulate one or more human voices, thereby providing additional motivation to the user of the scale.

Dieters typically seek to achieve broad goals, such as losing a dress size or simply looking better in their clothes. Rather than continuously tracking the specific numerical value of their weight, users of electronic scales often focus on round numbers (i.e., losing 10 pounds).

Furthermore, when attempting to lose weight, a user of a talking electronic scale may not wish their current weight to be displayed or widely announced to family members, friends, or passers by. Broadcasting a user's current weight can counteract the motivational effects of an electronic talking weight loss scale, since the user may feel embarrassed or intimidated by the numerical value of his or her weight. Consequently, it would be desirable to provide an improved method for encouraging weight loss via a talking electronic scale.

SUMMARY OF THE INVENTION

Disclosed is a method, system, and computer program product for encouraging weight loss via a talking electronic scale. A talking electronic scale stores and conceals the initial weight of a user in a data storage unit and subsequently compares the stored and concealed initial weight to the measured weight of the user at multiple points without ever displaying or announcing the numerical value of the user's weight. The talking electronic scale utilizes one or more light emitting diodes (LEDs), a speech synthesis unit, and a speaker to provide customized visual and audio feedback to the user based on the magnitude of the difference between the stored and concealed initial weight of the user and the current weight of the user. The audio feedback includes spoken words, sound effects, and music that are utilized to encourage the user to meet his or her weight loss goal.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method, system, and computer program product for encouraging weight loss via a talking electronic scale.

Figure 1A:
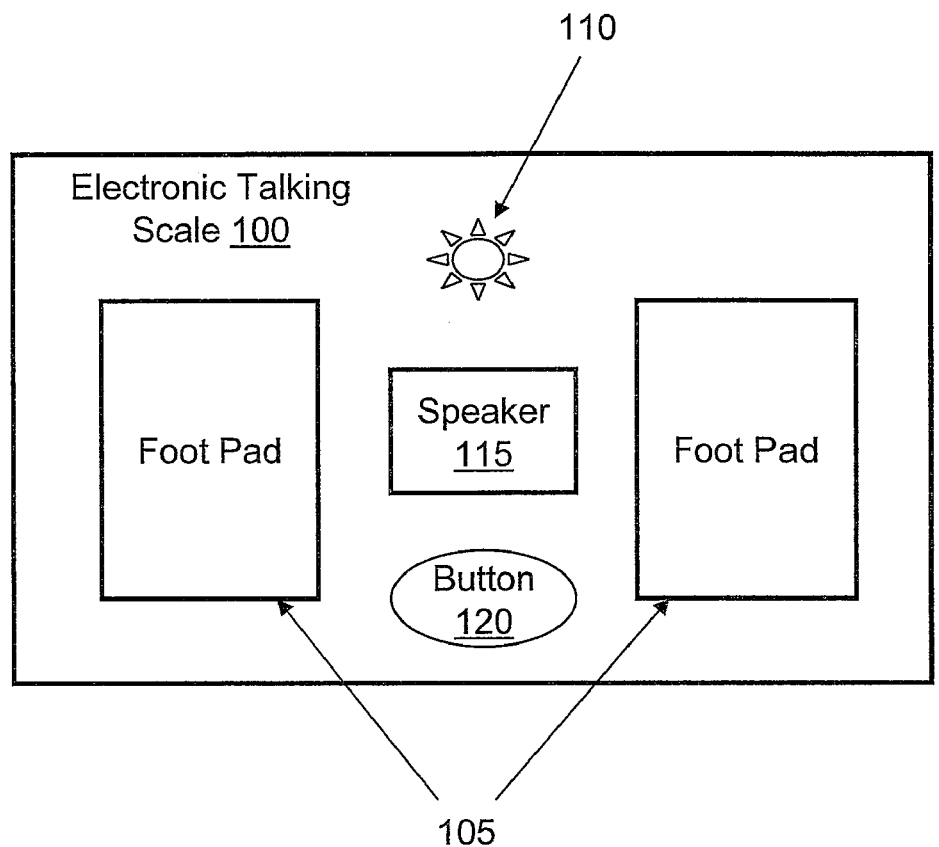
FIG. 1A depicts a schematic diagram of a talking electronic scale, as utilized in an embodiment of the present invention.

With reference now to FIG. 1A, there is depicted a schematic diagram of a talking electronic scale 100, as utilized in an embodiment of the present invention. As shown, talking electronic scale 100 includes multiple foot pads 105, one or more light emitting diodes (LEDs) 110, a speaker 115, and a button 120.

Figure 1B:
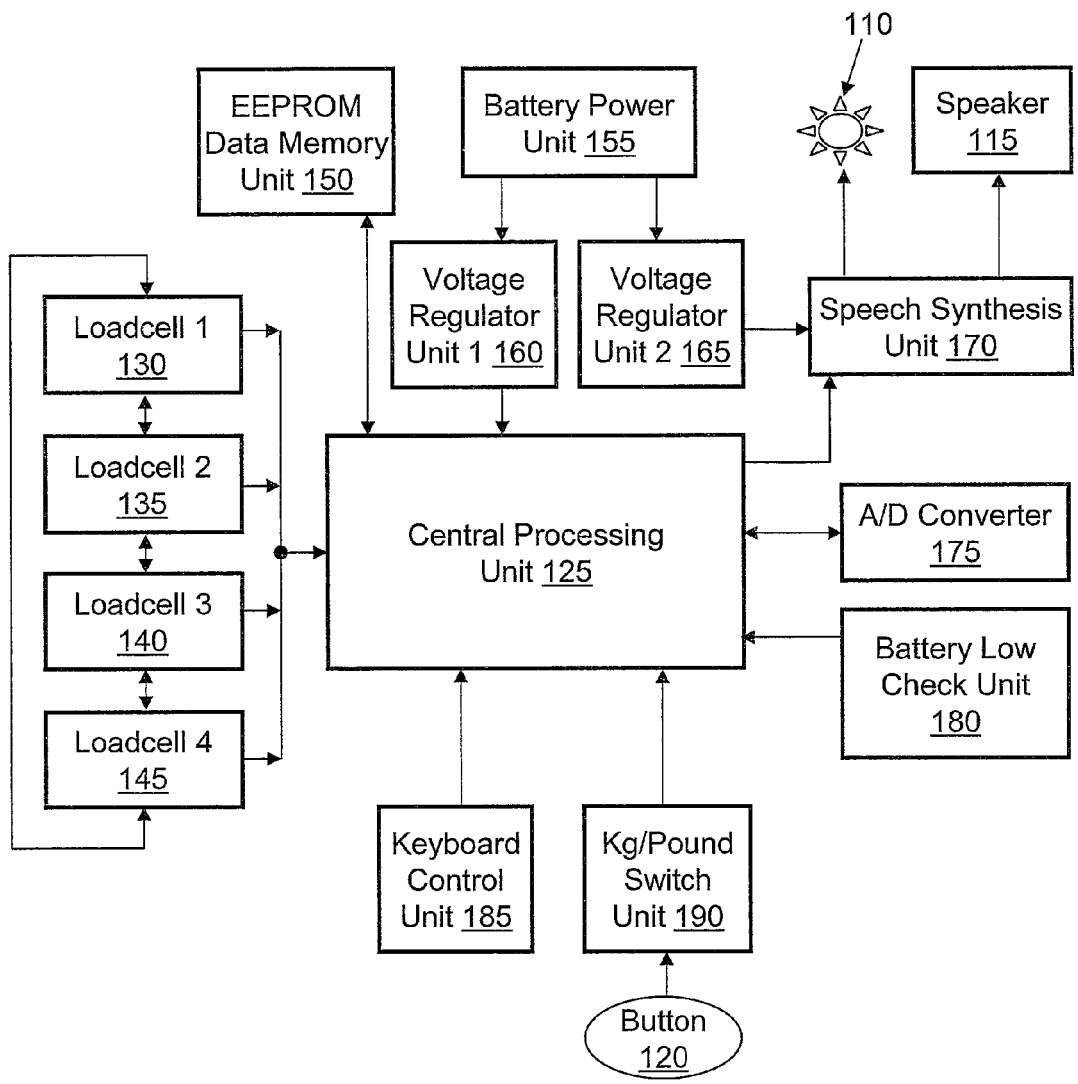
FIG. 1B depicts a high level block diagram of electronic components within the talking electronic scale of FIG. 1A, as utilized in an embodiment of the present invention.

Foot pads 105 enable talking electronic scale 100 to measure the weight of a user. In one embodiment, talking electronic scale 100 can visually signal a user by activating LEDs 110. Similarly, talking electronic scale 100 can provide audio output (e.g., spoken encouragement, sound effects, and/or music) to a user by utilizing speaker 115 and a speech synthesis program and/or device, which is illustrated in FIG. 1B and discussed below. In one preferred embodiment, the user can customize the audio output by utilizing button 120 to select one of multiple pre-stored themes, including, but not limited to, a military theme or a religious theme. If the user selects the military theme, the speech synthesis program provides voice commands modeled after a drill sergeant (e.g., "Step on the scale private!"). If the user selects a religious theme, the speech synthesis program provides voice commands that contain faith-based encouragement (e.g., "God loves you and will give you the strength to lose weight.").

Although the illustrative embodiment depicts multiple foot pads 105, in an alternate embodiment talking electronic scale 100 may instead utilize a single platform to measure the weight of a user. Similarly, talking electronic scale 100 may utilize a data memory unit, which is illustrated in FIG. 1B and discussed below, to track and conceal the weight loss of multiple users concurrently. In yet another embodiment, LEDs 110 may be replaced by one or more alternative light sources and/or a display screen (e.g., a liquid crystal display) capable of producing graphical output. Although FIG. 1 depicts LEDs 110, electronic talking scale 100 may be implemented without any visual display devices (i.e., with only audio output).

In an unillustrated embodiment, talking electronic scale 100 may include multiple one pound weights that may be utilized to symbolize the amount of weight lost by a user. In such an embodiment, each time the user loses one pound, the user can remove a one pound weight and place it in a pouch (e.g., a "fanny pack") that the user carries in order to physically feel the magnitude of their weight loss, thereby providing additional motivation to the user.

With reference now to FIG. 1B, there is depicted a high level block diagram of the electronic components within talking electronic scale 100, as utilized in an embodiment of the present invention. As shown, talking electronic scale 100 includes a central processing unit (CPU) 125, an Electronically Erasable Programmable Read-Only Memory (EE- PROM) data memory unit 150 coupled to CPU 125, and a speech synthesis unit 170 coupled to CPU 125. LEDs 110 and speaker 115 (from FIG. 1A) are coupled to speech synthesis unit 170. EEPROM data memory unit 150 includes multiple pre-stored audio themes and one or more concealed baseline weight measurements, as illustrated in FIG. 2 and discussed below.

Talking electronic scale 100 also includes a battery power unit 155, a first voltage regulator unit 160, a second voltage regulator unit 165, and a battery low check unit 180. Voltage regulator unit 160, which is coupled to battery power unit 155 and CPU 125, regulates the electrical power supplied to CPU 125. Similarly, voltage regulator unit 165, which is coupled to battery power unit 155 and speech synthesis unit 170, regulates the electrical power supplied to speech synthesis unit 170. Battery low check unit 180 is coupled to CPU 125 and enables talking electronic scale 100 to signal a user when the electrical power supplied by battery power unit 155 falls below a pre-defined level. In an alternate embodiment, talking electronic scale 100 may include a plug and an AC/DC converter unit that provides electrical power to the components of talking electronic scale 100 via an electrical wall outlet.

According to the illustrative embodiment, talking electronic scale 100 includes multiple weight sensors (e.g., transducers, piezoelectric sensors, and/or electromagnetic devices) coupled to CPU 125, including, but not limited to loadcells 130, 135, 140, and 145. CPU 125 is coupled to analog to digital (A/D) converter 175, which converts analog input from one or more devices (e.g., loadcell 130) into digital signals for processing by CPU 125. In one embodiment, a keyboard control unit 185 and a Kilogram/Pound switch unit 190 are each coupled to CPU 125. Kilogram/Pound switch unit 190 enables button 120 (FIG. 1A) to activate (i.e., power on) and/or provide input commands to CPU 125, as illustrated in FIG. 2 and described below. Keyboard control unit 185 enables one or more external input devices (e.g., a keyboard) to provide input commands to CPU 125. In an alternate embodiment, talking electronic scale 100 may include a "shake wake up" unit that activates talking electronic scale 100 in response to a user moving, tapping, or stepping on talking electronic scale 100.

Figure 2:
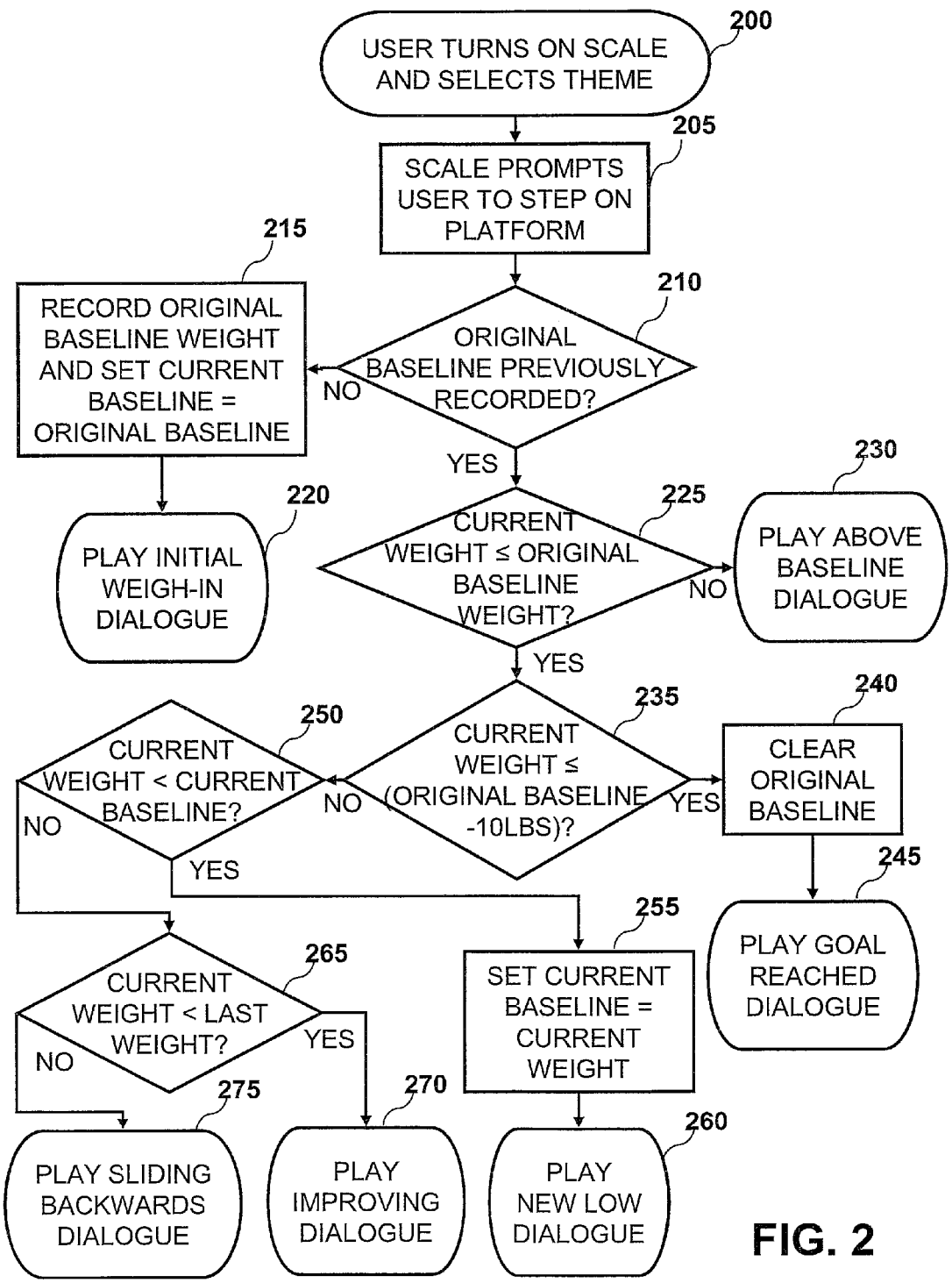
FIG. 2 is a high level logical flowchart of an exemplary method of encouraging weight loss via a talking electronic scale, in accordance with one embodiment of the invention.

Turning now to FIG. 2, there is illustrated an exemplary method of encouraging weight loss via a talking electronic scale, in accordance with one embodiment of the invention. The process begins at block 200 in response to a user pressing button 120 to activate talking electronic scale 100 and subsequently utilizing button 120 to select a pre-stored audio theme (e.g., the military theme or the religious theme) associated with one of several possible users. Talking electronic scale 100 utilizes speech synthesis unit 170 and speaker 115 to prompt the user to step onto foot pads 105, as depicted in block 205.

A determination is made whether EEPROM data memory unit 150 includes a previously recorded concealed baseline weight, as shown in block 210. If EEPROM data memory unit 150 does not include a previously recorded concealed baseline weight, talking electronic scale 100 measures the weight of the user (while concealing the value from the user), stores that current weight as the original concealed baseline weight, and sets the current concealed baseline weight equal to the original concealed baseline weight, as depicted in block 215. Talking electronic scale 100 then utilizes speaker 115 to play an "initial weigh-in" dialogue, which may include verbal instructions, sound effects, and/or music, and the process terminates, as shown in block 220.

If EEPROM data memory unit 150 does include a previously recorded and concealed baseline weight, talking electronic scale 100 measures the weight of the user and determines whether the current weight is less than or equal to the original concealed baseline weight, as depicted in block 225. If the current weight is greater than the original concealed baseline weight, talking electronic scale 100 utilizes speaker 115 to play an "above baseline" dialogue that motivates the user to increase their weight loss efforts and the process terminates, as shown in block 230.

If the current weight is less than or equal to the original concealed baseline weight, a determination is made whether the current weight is at least ten pounds less than the original concealed baseline weight, as depicted in block 235. If the current weight is at least ten pounds less than the original concealed baseline weight, talking electronic scale 100 clears the value of the original concealed baseline weight from EEPROM data memory unit 150, as shown in block 240. Talking electronic scale 100 then utilizes speaker 115 to play a "goal reached" dialogue, which preferably includes celebratory music and/or sound effects, and the process terminates, as depicted in block 245.

If the current weight is not at least ten pounds less than the original concealed baseline weight, a determination is made whether the current weight is less than the current baseline weight stored in EEPROM data memory unit 150, as shown in block 250. If the current weight is less than the current concealed baseline weight, talking electronic scale 100 sets the current concealed baseline weight equal to the current weight, as depicted in block 255. Talking electronic scale 100 then utilizes speaker 115 to play a "new low" dialogue, which notifies the user that they have achieved a new low, and the process terminates, as shown in block 260.

If the current weight is not less than the current concealed baseline weight, a determination is made whether the current weight is less than the last weight measured by talking electronic scale 100, as depicted in block 265. As utilized herein, the last weight is defined as the weight of the user measured when the user utilized talking electronic scale 100 during a session prior to the session in which the current weight was measured. If the current weight is less than the last weight, talking electronic scale 100 utilizes speaker 115 to play a "no new low, but improving" dialogue that encourages the user to maintain their efforts, and the process terminates, as shown in block 270.

If the current weight is not less than the last weight, talking electronic scale 100 utilizes speaker 115 to play a "sliding backwards" dialogue, which indicates that the user has recently gained weight, and the process terminates, as depicted in block 275.

The present invention thus enables talking electronic scale 100 to store and conceal the initial weight of a user in EEPROM data memory unit 150 and subsequently compare the stored initial weight to the measured weight of the user at multiple points without ever disclosing the numerical value of the user's weight. Talking electronic scale 100 utilizes one or more LEDs 110, speech synthesis unit 170, and speaker 115 to provide customized visual and audio feedback to the user based on the magnitude of the difference between the stored initial weight of the user and the current weight of the user. The audio feedback includes spoken words, sound effects, and music that are utilized to encourage the user to meet their weight loss goal.

It is understood that the use herein of specific names are for example only and not meant to imply any limitations on the invention. The invention may thus be implemented with different nomenclature/terminology and associated functionality utilized to describe the above devices/utility, etc., without limitation.

While an illustrative embodiment of the present invention has been described in the context of a fully functional data processing system with installed software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as thumb drives, floppy disks, hard drives, CD ROMs, DVDs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A talking electronic scale for encouraging weight loss comprising:

weighing means for determining the weight of a particular person in response to a specific user input;

storage means coupled to said weighing means for storing and concealing an initial weight for said particular person;

control means coupled to said weighing means and said memory means for comparing a subsequent weight of said particular person to said concealed initial weight in response to said specific user input; and speech synthesis means coupled to said control means for announcing a difference between said concealed initial weight and said subsequent weight for said particular person without ever displaying or announcing said initial weight.

2. The talking electronic scale of claim 1, further comprising a light emitting diode (LED), wherein said LED provides means for signaling a difference between said concealed initial weight and said subsequent weight for said particular person without ever displaying or announcing said initial weight.

3. The talking electronic scale of claim 1, wherein said specific user input comprises pressing a button coupled to said control means.

4. The talking electronic scale of claim 1, wherein said speech synthesis means comprises a plurality of audio themes.

5. The talking electronic scale of claim 4, wherein said plurality of audio themes comprises a military-based theme.

6. The talking electronic scale of claim 4, wherein said plurality of audio themes comprises a faith-based theme.

* * * * *